Sept. 24, 1963
A. J. FLECKENSTEIN ETAL
3,104,677
BRINE VALVES
Original Filed July 27, 1960
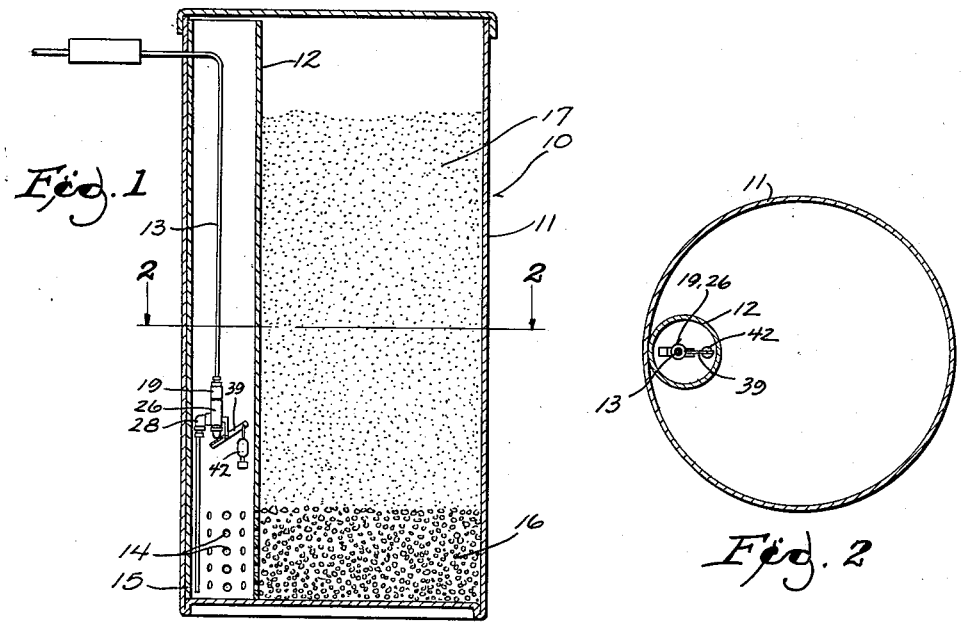
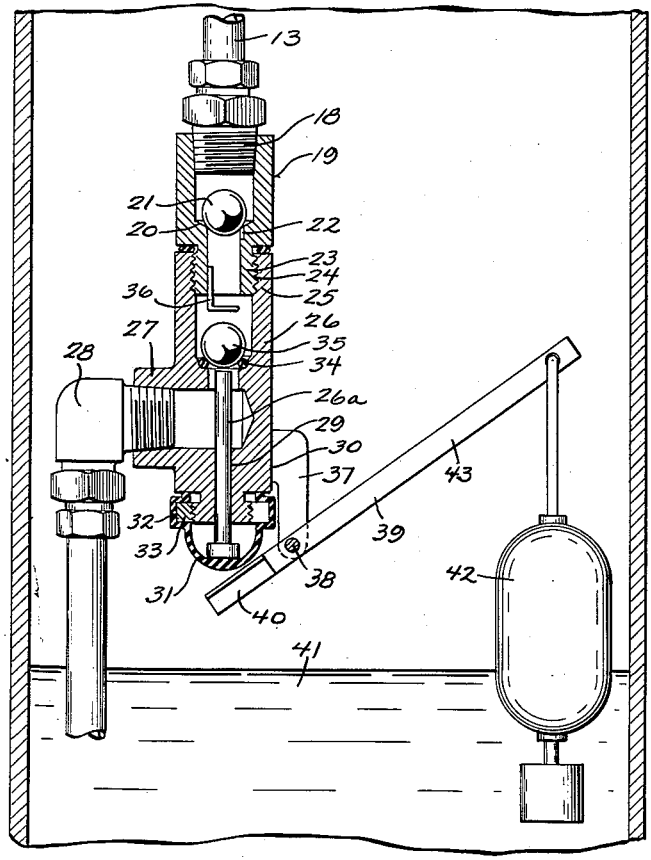
INVENTORS
ANDREW J. FLECKENSTEIN
LAMBERT W. FLECKENSTEIN
BY
*Gerald P. Welch*
ATTORNEY

United States Patent Office 3,104,677
Patented Sept. 24, 1963

3,104,677
BRINE VALVES
Andrew J. Fleckenstein, 13650 Squirrel Drive, Brookfield, Wis., and Lambert W. Fleckenstein, 4412 N. 51st Blvd., Milwaukee, Wis.
Continuation of application Ser. No. 45,597, July 27, 1960. This application Sept. 19, 1962, Ser. No. 225,413
7 Claims. (Cl. 137—391)

This application is a continuation of application Serial No. 45,597, filed July 27, 1960, now abandoned.

This invention relates to improvements in brine valves and more particularly to a novel composite brine valve.

An object of the invention is to provide a composite valve which will automatically permit entry of fluid into a water softener in response to the lowering of a level in the tank.

Other and further objects of the invention will appear as the description proceeds, reference being had to the accompanying drawings, in which:

FIGURE 1 is a wide view partly in section and partly in elevation of a water softener tank equipped with a brine valve embodying the invention;

FIGURE 2 is a plan view of the same; and

FIGURE 3 is a fragmentary view partly in section and partly in elevation of the brine valve and associated parts.

Referring more particularly to the drawing, the numeral 10 refers to the device generally, including a tank 11 and the relatively small tubular inner tank 12. A pipe 13 extends downwardly into tank 12 which has a plurality of lateral apertures as at 14 adjacent the lower end 15 thereof. In the tank 11 a layer of mineral 16 is topped by a quantity of salt 17.

At the lower end of pipe 13, a plug 18 is threaded into a valve body 19 provided with a frustro-conical lower annular shoulder, freely supporting the ball element 21. The shoulder 20 has a bleed port at 22 thereof. The lower end of the valve body 19 has a reduced portion 23 externally threaded at 24 and which is engaged within the upper internally threaded portion 25 of the valve body 26, which latter has the lateral socket 27 accommodating the elbow 28. A bore at 29 of the lower portion 30 of the valve body 26 accommodates the vertical pusher element which is retained against downward movement by the resilient dome stop 31 which has an internal channel formation at 32 engaged on the threaded collar 33 secured to the externally threaded lower portion 30 of the valve body 26. An O ring is seated on the shoulder 34 within the valve body 26 to receive the ball element 35.

A stop 36 limits the upward movement of the ball element 35. A bracket 37 supports by the pivot 38 the lever 39, the short arm 40 of which impinges upwardly against the dome element 31 to cause upward movement of the pusher element 26a when the fluid level at 41 descends allowing the float 42 on the long arm 43 of the lever 39 to drop. As the brine level lowers, the float 42 descends so that it is ready to hold the valve in the open position when the make up water is added to the brine tank. The valve opens on suction without requiring movement of the float. Stop 36 serves to break up the high velocity stream from bleed port 22 so that it does not impinge against the ball 35.

As will be seen in the drawings, both valve closing members 21 and 35 are subject to the pressure conditions in the lines 13 and 28. For example, when a suction condition exists at the upper end of the valve (as may be defined by fitting 19) both members 21 and 35 are raised from their seats, which allows flow of the liquid 41 through the passageway defined through fitting 28, the valve and body 26, the fitting 19 and through the line 13.

As this flow continues, the level of the fluid 41 drops, which results in float 42 dropping, with the result that push rod 26a is moved upwardly to positively hold valve 35 off of its seat.

In the absence of suction in the line 13 and/or with a positive pressure therein, both valves 35 and 21 may close against their seats by gravity. Fluid may bleed past valve closing member 21, as through bleed port 22, and through the valve seat 34, if the float is in the depressed position, which results in holding valve closing member 35 away from its seat to allow fluid to enter the tank 12. If the float 42 is at its upper position, as seen in FIGURE 3, the passageway through the valve body is closed by valve closing member 35, thereby stopping the flow of fluid to tank 12.

Whereas we have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

We claim:

1. In a control valve, a valve body having a passageway formed through said body and adapted to establish communication between opposite ends thereof, a pair of spaced valve seats in said passageway and a pair of independently movable valve closing members mounted in said passageway, each valve closing member being positioned for movement against one of said seats under the influence of gravity and away from one of said seats under the influence of suction, a bleed port bypassing one of the valve seats so as to subject the valve closing member for the other valve seat to suction and pressure conditions in the passageway on opposite sides of said one valve seat independent of the valve closing member therefor and thereby allow opening and closing movement, respectively of said valve closing member for the other valve seat in accordance with said conditions, a push rod slidably mounted in said valve body and having an end portion thereof positioned for contact with said second valve closing member, and a member movably mounted toward and away from said push rod, said member being interconnected with a float so as to move toward said push rod when said float is lowered and to move away from said push rod when said float is raised, said member having one end thereof positioned for movement against said push rod to hold said second valve member away from its seat under influence of said float when said float is moved to a lowered position while allowing movement of said second valve member away from its seat independently of said member when said float is at an upper position.

2. The structure of claim 1 characterized by and including a stop positioned between said two valve seats and adapted to limit movement of said second valve closing member away from said seat.

3. The structure of claim 1 wherein each valve closing member is in the form of a ball.

4. The structure of claim 1 characterized by and including a diaphragm enclosing an end of said push rod and positioned externally of said valve body, said last named member has one end thereof positioned for actuating contact with said diaphragm and thereby said push rod, the other end of said member having a float mounted thereon.

5. In a level control valve, a valve body having an inlet and an outlet, passage means formed through said body and adapted to establish communication between said inlet and said outlet, a pair of spaced valve seats in said passageway and a pair of independently movable valve closing members mounted in said passageway, each valve closing member being positioned for movement against and away from one of said seats, a bleed port bypassing the valve seat nearest said inlet so as to subject the valve closing member for the other valve seat to a suction condition in said inlet, while allowing a restricted flow from said inlet to said outlet when said valve closing member for the valve seat nearest the inlet is closed upon its seat and said other valve closing member is away from its seat, a push rod slidably mounted in said valve body and having an operative connection with said second valve closing member, and a float and actuated means interconnected therewith and with said push rod to hold said second valve member away from its seat under influence of said float when said float is moved to a predetermined lowered position while allowing movement of said second valve member toward and away from its seat to close and open the valve under the influence of pressure conditions when said float is at positions above said predetermined lowered position.

6. In a control valve, a valve body having a passageway formed through said body and adapted to establish communication between opposite ends thereof, a pair of spaced valve seats in said passageway and a pair of independently movable valve closing members mounted in said passageway, each valve closing member being positioned for movement against one of said seats under the influence of gravity and away from one of said seats under the influence of suction, a bleed port bypassing one of the valve seats so as to subject the valve closing member for the other valve seat to suction and pressure conditions in the passageway on opposite sides of said one valve seat independent of the valve closing member therefor and thereby allow opening and closing movement, respectively of said valve closing member for the other valve seat in accordance with said conditions, a push rod slidably mounted in said valve body and having an operative connection with said second valve closing member, and a member movably mounted toward and away from said push rod, said member being interconnected with a float so as to move toward said push rod when said float is lowered and to move away from said push rod when said float is raised, said member having one end thereof positioned for movement against said push rod to hold said second valve member away from its seat under influence of said float when said float is moved to a lowered position while allowing movement of said second valve member away from its seat independently of said member when said float it at an upper position.

7. The structure of claim 6 wherein each valve closing member is in the form of a ball and said valve body has a flexible diaphragm enclosing one end of said push rod and positioned externally of said valve body, and wherein last named member has one end thereof positioned for actuating contact with said diaphragm and thereby said push rod, the other end of said member having a float mounted thereon.

References Cited in the file of this patent
UNITED STATES PATENTS

| | | |
|---|---|---|
| 951,855 | Sullivan | Mar. 15, 1910 |
| 2,756,769 | Martin et al. | July 31, 1956 |
| 2,906,285 | Rosten et al. | Sept. 29, 1959 |
| 2,962,041 | Johnson | Nov. 29, 1960 |